United States Patent

[11] 3,599,482

[72] Inventor Herbert A. Rundell
 Houston, Tex.
[21] Appl. No. 833,383
[22] Filed June 16, 1969
[45] Patented Aug. 17, 1971
[73] Assignee Texaco Inc.
 New York, N.Y.

[54] HEAVY DUTY DYNAMIC TORQUE MEASURING DEVICE
 5 Claims, 1 Drawing Fig.

[52] U.S. Cl. .................................................. 73/136 A
[51] Int. Cl. .................................................. G01l 3/04
[50] Field of Search ......................................... 73/136,
 139, 1 D

[56] References Cited
 UNITED STATES PATENTS
 925,180 6/1909 Harris .............................. 73/136
 3,295,367 1/1967 Rundell ........................... 73/136
 3,339,405 9/1967 McDowall ....................... 73/136
 FOREIGN PATENTS
 617,064 2/1949 Great Britain ................. 73/136

Primary Examiner—Charles A. Ruehl
Attorneys—K. E. Kavanagh and Thomas H. Whaley

ABSTRACT: A heavy duty coupling mechanism for use in measuring high torque. It includes a torque shaft with dynamic torque measuring instruments mounted thereon spaced longitudinally apart along the shaft. There is a pair of sprockets at one end of the torque shaft. One sprocket is solidly mounted on the shaft, and the other is mounted for free relative rotation at that end of the shaft but with heavy-duty connection to the other end.

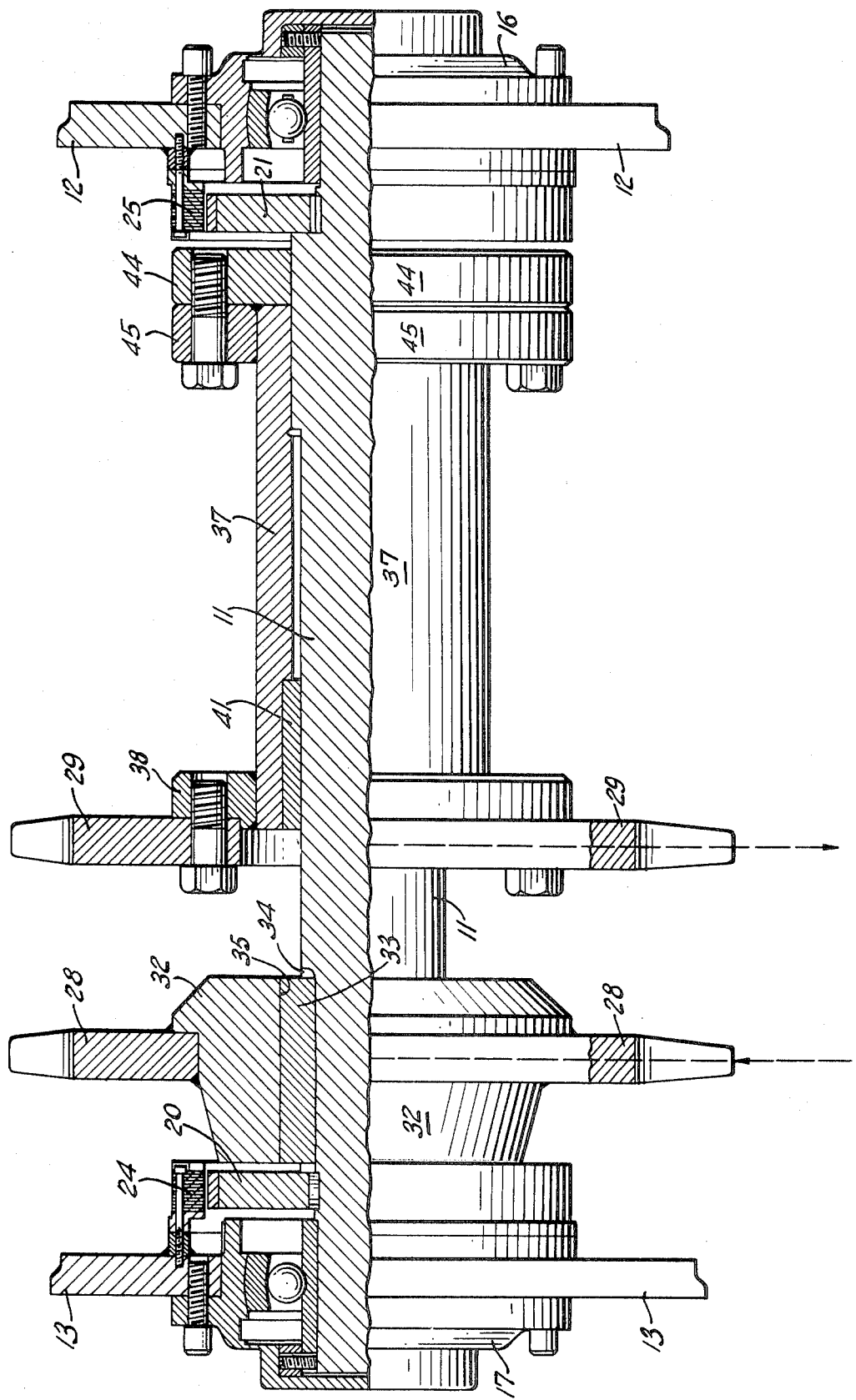

HEAVY DUTY DYNAMIC TORQUE MEASURING DEVICE

BACKGROUND OF THE INVENTION

1. Field of the Invention

This invention relates to a mechanical coupling structure. In particular, it concerns a torque shaft and related structural elements for transferring mechanical energy laterally with respect to the axis of the torque shaft.

DESCRIPTION OF THE PRIOR ART

In connection with oil well drilling and similar activities, there has been found to be a need for rugged and yet sensitive dynamic torque meters. Such need has been met by an arrangement as described in the applicant's prior U.S. Pat. No. 3,295,367 issued Jan. 3, 1967. However, that particular structure was designed for use in a direct axially aligned connection between a power drive shaft and the input rotary table. Such structure has the drawback that it is not readily adaptable to a substantial number of commercial arrangements because they are set up and provided with nonaligned rotary table input shaft and power output shaft.

Consequently, since a shaft drive axially aligned coupling is very often not employed with a drilling rig, it is an object of this invention to provide an arrangement for adapting the torque shaft unit of a dynamic torque meter for use with a chain drive.

Another object of the invention is to provide a torque coupling unit that is adaptable for temporary installation on a drilling rig.

SUMMARY OF THE INVENTION

Briefly the invention may be described as a heavy duty dynamic torque measuring coupling. It comprises in combination, a shaft for transmitting high torque loads, and also means for dynamically measuring the amount of relative angular displacement at two locations spaced apart a substantial distance along said shaft. The coupling also comprises a pair of gears at one of said locations for laterally coupling said load to said shaft. One of said gears is integrally attached to said shaft at said location, for rotation therewith at all times. The coupling also comprises means for coupling the other of said gears to said shaft at the other of said locations, without impairing said relative angular displacement of the shaft.

BRIEF DESCRIPTION OF THE DRAWING

The foregoing and other objects and benefits of the invention will be more fully set forth below in connection with the best mode contemplated by the inventor of carrying out the invention, and in connection with which there are illustrations provided in the drawings, wherein:

The FIG. of the drawings is a side elevation, partly broken away in cross section and illustrating a coupling unit in accordance with the invention.

DESCRIPTION OF THE PREFERRED EMBODIMENT

Referring to the drawing, it is pointed out that there is a torque shaft 11 that is supported at each end by any feasible support structure, such as a support member 12 at the right-hand end (as viewed in the drawing) and another similar support member 13 at the left-hand end. These members 12 and 13 carry bearings 16 and 17 respectively which are preferably low-friction ball bearing units, as illustrated.

Near each end of the shaft 11, i.e. spaced axially apart a substantial distance along the shaft, there is a pair of similar rotors 20 and 21. In each case these are securely attached to the shaft 11 and rotate in unison therewith. Cooperating with the rotors 20 and 21 there are stators 24 and 25 respectively. The stators 24 and 25 together with the rotors 20 and 21, in each case, go to make up the principal elements of a pair of AC generators. Consequently, the dynamic torque measurements desired may be carried out. Since the structure and other details of these generators as part of a torque measuring unit are substantially the same as those illustrated and described in my prior U.S. Pat. 3,295,367, mentioned above, no further explanation of these elements is needed.

In order to adapt a torque meter of the foregoing type (disclosed in my above-mentioned prior patent) for use with laterally offset driving connection between a power source (not shown) and a rotary table (not shown), there is provided a pair of gears 28 and 29. These gears might take different specific forms; however, the illustrated ones are sprocket wheels in order to provide for making chain drive connections to the input and output of the torque shaft unit.

The sprocket wheel, or gear, 28 is fixedly mounted on the shaft 11 near one end thereof. This may be accomplished in any feasible manner such as that illustrated which includes a hub 32 to which the sprocket 28 is welded or otherwise securely attached. The hub 32 is fixed securely onto the shaft 11 for rotation therewith without any relative moment therebetween. Again, this may be done in any feasible manner, e.g. as illustrated, by having a key 33 that is inserted into a keyway 34 on the shaft 11. Of course, the key 33 is also fitted tightly into a groove 35 located on the inner periphery of the central bore through the hub 32. It will now be clear that rotational driving force may be introduced by means of a chain (not shown) that would be placed onto the sprocket 28. There would be substantially no slack or relative movements between the sprocket 28 and that end of the shaft 11 where it is mounted, because of the mounting just described. Thus, sprocket 28 which is carried by the hub 32, is in turn securely mounted on the shaft 11. It will be appreciated that the hub 32 might be welded onto the shaft 11 if desired. In addition, it will be noted that the sprocket 28 is close to the rotor 20 so that the rotational position of shaft 11 at the sprocket 28 will be substantially the same as that of the rotor 20 at all times.

In order to provide a chain drive coupling that is located adjacent to the sprocket 28 while reflecting the position of the other rotor 21 with respect to rotor 20, there is a heavy-duty sleeve 37. Sleeve 37 is securely attached at one end to the sprocket wheel or gear 29 in any feasible manner, e.g. by having a ring 38 to which the sprocket 29 may be bolted. The ring 38 is welded onto the sleeve 37 at the left-hand end thereof, as viewed in the drawing. However, in order to permit the torque between rotors 20 and 21 to be that indicated by relative displacement of the ends of shaft 11, there is a low-friction support bearing 41. This bearing 41 is schematically indicated and is located at the end of the sleeve 37 to which the sprocket 29 is attached. It provides antifriction support around the shaft 11 for the sleeve 37 and the sprocket 29.

At the other end of the sleeve 37, i.e. adjacent to the rotor 21, the sleeve is securely attached to the shaft 11 in any feasible manner. For example, there may be a flange 44 that is welded onto the shaft 11 and to which there is bolted a ring 45 that in turn is welded onto the end of the sleeve 37. In this manner the right-hand end (as viewed in the drawing) of the sleeve 37 is securely attached to the shaft 11 adjacent to the rotor 21, so that they will rotate together at all times.

It is pointed out that the rotor 21 could be carried by the sleeve 37, at any convenient location axially there along, instead of being carried by the shaft 11, as illustrated. This would, of course, necessitate some changes (not shown) in the support structure for the stator 25.

It will be appreciated that a coupling unit according to this invention permits a chain drive, or other type of lateral coupling arrangement, to be applied to a torque shaft. This is accomplished while maintaining the sprockets, or gears for such coupling, adjacent to one another.

While the structure according to this invention may be applicable to other uses, in general, it is particularly adaptable for use with a prevalent arrangement of drive couplings that are used in connection with oil well drilling. Such application employs a rotary table to cause the drill to be rotated during drilling operations. The driving connection structure makes use of chain couplings to connect the power source to the rotary table. Furthermore, the aligned chain coupling employed does not leave enough room to introduce a torque shaft therebetween.

Also, a coupling unit according to this invention is readily adaptable to temporary connection in a conventional drilling rig. One reason for this is the fact that because of the adjacent location of the sprocket wheels, there is a minimum axial shifting required of the existing sprockets on their shafts.

While the foregoing description has been set forth in considerable detail in accordance with the applicable statutes, this is not to be taken as in any way limiting the invention, but merely as being descriptive thereof.

I claim:

1. A heavy duty dynamic torque measuring coupling, comprising in combination
    a shaft for transmitting high torque loads,
    means for dynamically measuring the amount of relative angular displacement at two locations spaced axially apart a substantial distance along said shaft,
    a pair of gears both located at one of said locations for laterally coupling said load to said shaft,
    one of said gears being integrally attached to said shaft at said location for rotation therewith at all times, and
    means for coupling the other of said gears to said shaft at the other of said locations without impairing said relative angular displacement of the shaft locations.

2. A coupling according to claim 1 wherein said pair of gears comprise sprocket wheels.

3. A coupling according to claim 2 wherein said coupling means comprises a sleeve and low-friction bearing means for supporting said other gear on said shaft at said one location.

4. A coupling according to claim 3 wherein said coupling means further comprises means for integrally attaching said sleeve to said shaft at said other location.

5. A heavy duty dynamic torque measuring coupling, comprising in combination
    a shaft for transmitting high torque loads,
    a pair of AC generators, one located at each of two locations spaced axially apart a substantial distance along said shaft,
    a pair of load-carrying gears both located at one of said locations for laterally coupling said load to said shaft,
    one of said gears being integrally attached to said shaft at said location for rotation therewith at all times, and
    means for coupling the other of said gears to said shaft at the other of said locations comprising
    a heavy-duty sleeve and low-friction means for supporting said other gear on said shaft at said one location and,
    means for integrally attaching said heavy duty sleeve to said shaft at said other location for rotation therewith at all times.